INVENTORS
ROBERT W. PETERS
FREDRICK G. LUBER

INVENTORS
ROBERT W. PETERS
FREDRICK G. LUBER

ATTORNEYS

United States Patent Office 3,432,707
Patented Mar. 11, 1969

3,432,707
THREE PHASE CONCENTRIC STATOR WINDINGS AND METHOD OF WINDING
Robert W. Peters, Menomonee Falls, and Frederick G. Luber, Milwaukee, Wis., assignors to Henry J. Gorski, Milwaukee, Wis.
Filed Oct. 20, 1965, Ser. No. 498,350
U.S. Cl. 310—180                  15 Claims
Int. Cl. H02k 3/00, 3/12, 3/48

ABSTRACT OF THE DISCLOSURE

A three-phase stator winding wherein the phase windings are wholly contained in respective coil layers which are generally concentrically arranged with respect to one another. In any one slot, the turns are all from the same one of the phase windings.

A method of winding a pair of adjacently located coil groups forming a part of a phase winding wherein a first coil of one of the coil groups is wound in one rotative direction, followed by winding of one coil of the other coil group in the opposite rotative direction. Subsequently, another coil in the other coil group is wound in the same direction as the previous coil and in radially outward concentric relation thereto, followed by winding, in the reverse rotational direction of a second coil in the first mentioned coil group in radially outwardly concentric relation to the first coil.

---

The invention relates generally to stator winding arrangements. More particularly, the invention relates to three-phase stator winding arrangements and to stator winding methods.

The invention provides an improved stator winding arrangement for a three-phase motor which offers the advantages of employing less copper wire without loss of desirable electrical characteristics. A further advantage results from the absence of any requirement for the use of slot insulation for the purpose of separating, in any particular stator slot, one phase winding from another.

The invention provides a three-phase stator winding in which the phase windings are each wholly contained in respective coil layers which are generally concentrically arranged with respect to one another. In addition, in accordance with the invention, the turns in any slot are all from one of the phase windings. Also in accordance with the invention, the coils which comprise the various phase windings are formed with lesser arcuate spans than heretofore in stators of comparable electrical characteristics. Also in accordance with the invention, the poles of the phase windings are formed through cooperation of adjacent coil groups in the phase windings.

Still further, the invention includes a method of winding a pair of adjacently located coil groups forming a part of a phase winding wherein a first coil of one of the coil groups is wound in one rotative direction, followed by winding of one coil of the other coil group in the opposite rotative direction. Subsequently, another coil in the other coil group is wound in the same direction as the previous coil and in radially outward concentric relation thereto, followed by winding, in the reverse rotational direction of a second coil in the first mentioned coil group in radially outwardly concentric relation to the first coil.

Other objects and advantages of the invention will become known by reference to the following description and accompanying drawings in which.

Figure 1:
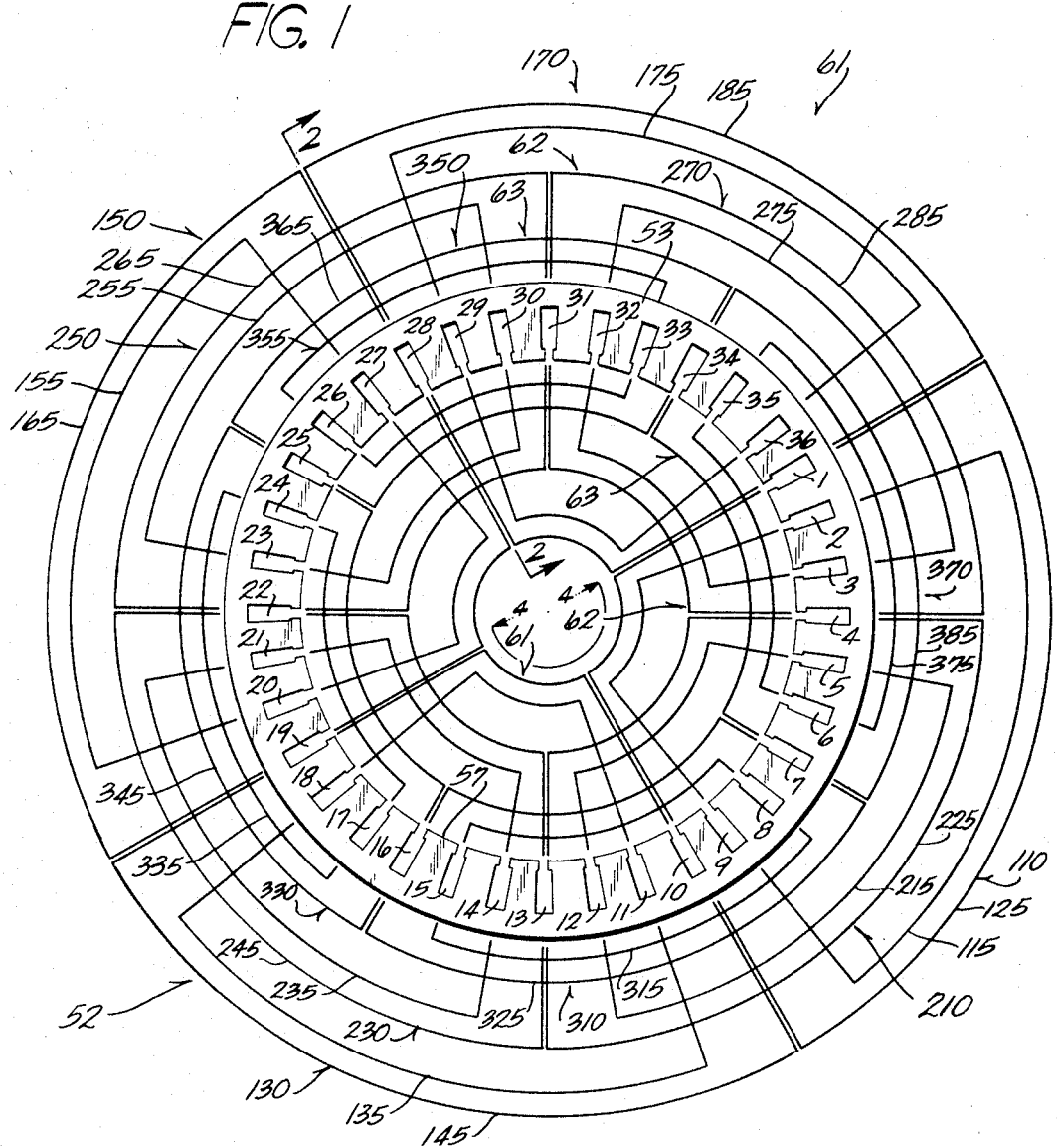
FIGURE 1 is a diagrammatic view of a wound stator embodying various of the features of the invention.
Figure 2:
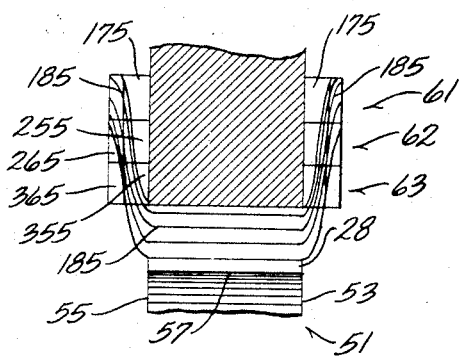
FIGURE 2 is a diagrammatic sectional view taken generally along line 2—2 of FIGURE 1.
Figure 3:
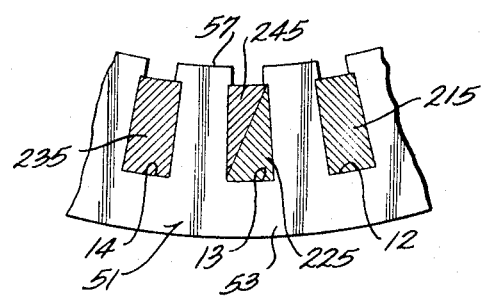
FIGURE 3 is an enlarged fragmentary view of a portion of the wound stator shown in FIGURE 1.

Shown partially schematically in FIGURE 1 is a stator 51 having thereon a three-phase winding arrangement 52 in accordance with the invention. The stator 51 includes a pair of end faces 53 and 55 (see FIGURE 2), a central bore 57, and a plurality of stator slots. While the features of the invention are applicable to stators having various numbers of coil slots, the winding arrangement 52 disclosed in FIGURE 1 is particularly adapted for a thirty-six slot stator. Accordingly, the stator 51 includes thirty-six coil slots which are numbered 1 through 36, inclusive.

The winding arrangement includes first, second, and third phase windings 61, 62, and 63, respectively, with the first phase winding 61 defining a first or radially outermost coil layer, with the second phase winding 62 defining a second or radially intermediate coil layer, and with the third phase winding 63 defining a third or radially inner coil layer. Each phase winding or coil layer is wound in generally identical manner to obtain symmetry and includes two pairs of coil groups, with each coil group including an inner and outer coil.

More specifically, the first phase winding 61 includes a first pair of coil groups 110 and 130 and a second pair of coil groups 150 and 170. The second phase winding 62 includes a first pair of coil groups 210 and 230 and a second pair of coil groups 250 and 270. The third phase winding includes a first pair of coil groups 310 and 330 and a second pair of coil groups 350 and 370.

Except for the direction of winding, each of the coil groups is generally identical and includes an inner coil having as will be seen hereinafter, a span of 70 degrees and an outer coil having a span of 90 degrees. Thus, the coil group 110 includes inner and outer coils 115 and 125, respectively; the coil group 130 includes inner and outer coils 135 and 145, respectively; the coil group 270 includes inner and outer coils 175 and 185, respectively; the coil group 210 includes inner and outer coils 215 and 225, respectively; the coil group 230 includes inner and outer coils 235 and 245, respectively; the coil group 250 includes inner and outer coils 255 and 265, respectively; the coil group 270 includes inner and outer coils 275 and 285, respectively; the coil group 310 includes inner and outer coils 315 and 325, respectively; the coil group 330 includes inner and outer coils 335 and 345, respectively; the coil group 350 includes inner and outer coils 355 and 365, respectively; and the coil group 370 includes inner and outer coils 375 and 385, respectively.

The four coil groups of each phase cooperate to provide four poles which are located at 90 degrees from one another and which respectively span three slots. Thus, in the disclosed construction, the four poles in the first phase winding 61 span the coils slots 36, 1, 2–9, 10, 11–18, 19, 20–27, 28, 29. The four poles in the second phase winding 62 span the stator slots 3, 4, 5–12, 13, 14–21, 22, 23–30, 31, 32. The four poles in the third phase winding 63 span the stator slots 6, 7, 8–15, 16, 17–24, 25, 26–33, 34, 35.

Figure 4:
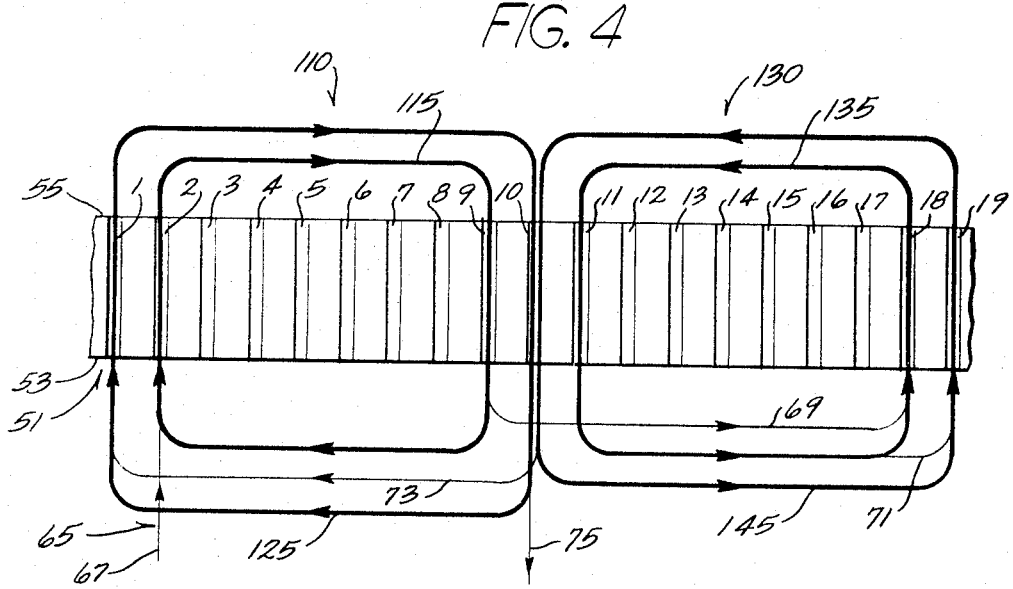
FIGURE 4 is a schematic interior elevational view taken generally along line 4—4 of FIGURE 1, with portions omitted.

In accordance with the preferred method, each pair of coil groups are wound in an integrated operation. As an example, the winding of the coil groups 110 and 130 is best understood by reference to FIGURE 4. As shown therein, a wire 65 providing a tap 67 is first laid through the slot 2 from the face 53 to the face 55. The wire is then laid arcuately and radially outwardly from the bottom of the coil slots along the stator face 55 to the slot 9, then through the slot 9 to the face 53, and then arcuately along the face 53 and radially outwardly from the bottom of the coil slots back to the slot 2 to complete the first turn of the coil 115, which coil has a span of 70 degrees. As many turns as may be desired can be included in the coil 115. With reference to FIGURE 4, it will be seen that the coil 115 is wound in the clockwise direction.

After the desired number of turns has been laid in the coil 115, the wire emerging from the slot 9 is laid along the face 53 with a portion 69 extending to the slot 18. The wire 65 is then laid through the slot 18 from the face 53 to the face 55, then arcuately along the face 55 radially outwardly of the bottom of the stator slots to the slot 11, then through the slot 11 to the face 53, and then arcuately along the face 53 radially outwardly of the bottom of the stator slots to the slot 18 to complete the first turn of the coil 135, which coil has a span of 70 degrees. As can be seen by reference to FIGURE 4, the coil 135 is wound in the opposite rotative direction from the coil 115, i.e., in the counterclockwise direction. The coil 135 is formed with substantially the same number of turns as the coil 115.

After completion of the coil 135, the wire 65 extending along the face 53 is laid with a portion 71 extending to the slot 19. The wire 65 is then laid through the slot 19 from the face 53 to the face 55, then in generally axially outwardly overlying relation to the coil 135 to the slot 10, then through the slot 10 to the face 53, and then arcuately in generally axially outwardly overlying relation to the coil 135 to the slot 19 to complete the first turn of the coil 145. From the foregoing, it will be observed that the coil 145 is laid in the same rotative direction as the coil 135. The coil 145 is provided with approximately one-half of the number of turns included in the coil 135.

Upon completion of the coil 145, the wire 65 emerging from the slot 10 is then laid with a portion 73 extending along the stator face 53 to the slot 1. The wire is then laid in the slot 1 from the face 53 to the face 55, then in generally axially outwardly overlying relation to the coil 135 to the slot 10, then through the slot 10 to the face 53, and then in generally axially outwardly overlying relation to the coil 135 to the slot 1 to provide the first turn of the coil 125. The coil 125 is provided with substantially the same number of turns as the coil 145, i.e., with approximately one-half of the number of turns in the coils 115 and 135. As can be seen by reference to FIGURE 4, the coil 125 is wound in the reverse rotative direction from the coils 135 and 145, i.e., in the same rotative direction as the coil 115. After the coil is completed, the wire 65 can be cut to provide a tap 75.

If desired, both of coil groups in the first or outer phase windings can be wound simultaneously by use of a winding head such as disclosed in application Ser. No. 445,010 filed Apr. 2, 1965. Alternatively, the two pairs of coil groups in the first phase winding can be sequentially wound.

After completion of the first phase winding 61, the second phase winding 62 is executed in like manner to the first phase winding, except that the second phase winding is shifted 30 degrees from the first phase winding and that the radial distance from the stator axis to the arcuate portions of the coils in the second phase winding is less than the radial distance to the arcuate portions of the coils in the first phase winding 61. Thus, the coils in the second phase winding 62 define a coil layer which is radially inwardly of the first phase winding 61. After completion of the second phase winding 62, the third phase winding 63 can be executed in like fashion to the first and second phase windings, except that the third phase winding is displaced 60 degrees from the first phase winding and 30 degrees from the second phase winding, and that the arcuate portions of the coils in the third phase winding are located at lesser radial distances from the axis of the stator than the coils in the second phase winding, thereby providing the innermost coil layer.

As can be seen from the foregoing, each of the phase windings includes four taps. The taps may be connected to one another in either a Y or delta arrangement in a manner well known in the art.

From the foregoing, it is apparent that all of the coil slots have approximately the same number of turns therein and that all of the turns in any one of the slots are all from the same phase. Thus, electrical symmetry is achieved without requiring any insulation in the slots to separate phase windings because the potential difference between the adjacent coils in the same phase winding is much less than would occur if the wires were of two different phase windings. Moreover, because the coils are located in three layers, the axial extent of the wound stator is materially reduced, thereby saving on both copper and space. Still further, the amount of copper in the winding is reduced by the shortening of the spans.

While the preferred winding method involves simultaneous winding of two coil groups, the winding could be achieved either by sequentially winding the coil groups or by simultaneously winding all of the coil groups in each phase and subsequently connecting the coil groups to provide the disclosed arrangement.

Various of the features of the invention are set forth in the following claims.

What is claimed is:

1. A winding arrangement for a stator, said winding arrangement comprising first, second, and third phase windings in lapped relation to one another, said first phase winding defining a first coil layer, said second phase winding defining a second coil layer located radially outwardly of said first coil layer with respect to the axis of the stator, said third phase winding defining a third coil layer located radially outwardly of said second coil layer with respect to the axis of the stator, each of said phase windings including a plurality of coil groups each including a plurality of coils each having a plurality of turns laid in a pair of angularly spaced stator slots, said turns in all of said stator slots being wholly of any one of said phases.

2. The combination of a stator having a plurality of slots and a winding arrangement comprising first, second, and third phase windings in lapped relation to one another, said first phase winding defining a first coil layer, said second phase winding defining a second coil layer located radially outwardly of said first coil layer with respect to the axis of the stator, said third phase winding defining a third coil layer located radially outwardly of said second coil layer with respect to the axis of the stator, each of said phase windings including a plurality of coil groups each including a plurality of coils each having a plurality of turns laid in a pair of angularly spaced stator slots, said turns in all of said stator slots being wholly of any one of said phases.

3. The combination of a stator having a plurality of slots and a winding arrangement comprising a phase winding including a series of coil groups, each of said coil groups having an inner coil with a pair of angularly spaced lengths laid in a first spaced pair of said stator slots, and an outer coil concentric with said inner coil and having a pair of angularly spaced legs laid in a second spaced pair of said stator slots, said outer coils having approximately one-half the number of turns of said inner coils, and said legs of each of said outer coils respectively occupying the same stator slots as the adjacent one of said legs of the adjacent ones of said outer coils.

4. The combination of a stator having a plurality of slots and a winding arrangement comprising first, second, and third phase windings in lapped relation to one another, said first phase winding defining a first coil layer, said second phase winding defining a second coil layer located radially outwardly of said first coil layer with respect to the axis of the stator, said third phase winding defining a third coil layer located radially outwardly of said second coil layer with respect to the axis of the stator, each of said first, second, and third phase windings including a series of coil groups, each of said coil groups having an inner coil with a pair of angularly spaced lengths laid in a first pair of said stator slots, and an outer coil concentric with said inner coil and having a pair of angularly spaced legs laid in a second pair of spaced stator slots, said outer coils having approximately one-half the number of turns in said inner coils.

5. The combination of a stator having thirty-six slots and a winding arrangement comprising first, second, and third phase windings in lapped relation to one another, said first phase winding defining a first coil layer, said second phase winding defining a second coil layer located radially outwardly of said first coil layer with respect to the axis of the stator, said third phase winding defining a third coil layer located radially outwardly of said second coil layer with respect to the axis of the stator, each of said first, second, and third phase windings including four coil groups, each of said four coil groups having an inner coil with a pair of angularly spaced legs laid in stator slots spaced seventy degrees from each other, and an outer coil concentric with said inner coil and having a pair of angularly spaced legs laid in stator slots spaced at ninety degrees from each other, said outer coils having approximately one-half the number of turns in said inner coils, said legs of each of said outer coils respectively occupying the same slot as the adjacent one of said legs of the adjacent ones of said outer coils whereby in each phase winding there is provided four poles each defined by the turns laid in four groups of three adjacent slots, whereby all of the coil slots have substantially the same number of turns, and whereby the turns in each one of the slots are all from the same phase winding.

6. The combination of a stator having a plurality of coil slots and a winding arrangement comprising a first coil laid in a first pair of angularly spaced stator slots, a second coil laid in a second pair of angularly spaced stator slots spaced from said first pair of stator slots, a third coil laid concentrically with said second coil in a third pair of stator slots, one of said third pair of stator slots being located between said first and second pairs of stator slots, and a fourth coil located concentrically with said first coil and in a fourth pair of angularly spaced stator slots, one of said slots of said fourth pair of stator slots being located between said first and second pairs of stator slots, and said first and second coils having substantially the same number of turns and said third and fourth coils each respectively having approximately one-half the number of turns in said second and first coils.

7. The combination of a stator having a plurality of coil slots and a winding arrangement comprising a first coil laid in a first pair of angularly spaced stator slots, a second coil laid in a second pair of angularly spaced stator slots spaced from said first pair of stator slots, a third coil laid concentrically with said second coil in a third pair of stator slots, one of said third pair of stator slots being located between said first and second pairs of stator slots, and a fourth coil located concentrically with said first coil and in a fourth pair of angularly spaced stator slots, one of said slots of said fourth pair of stator slots being said one slot of said third pair of stator slots, said first and second coils being connected in series for current flow in opposite rotative directions, said third coil being connected in series to said second coil for current flow in the same rotative direction, said fourth coil being connected in series to said third coil for current flow through said fourth coil in the same direction as in said first coil, and said first and second coils having substantially the same number of turns and said third and fourth coils each respectively having approximately one-half the number of turns in said second and first coils.

8. A stator winding method comprising the steps of initially winding a first series of coil groups to provide a first coil layer, subsequently winding a second series of coil groups in lapped relation to the first series of coil groups to provide a second coil layer inwardly of the first coil layer with respect to the stator axis, and subsequently winding a third series of coil groups in lapped relation to the first and second series of coil groups to provide a third coil layer inwardly of the second coil layer with respect to the axis of the stator.

9. A stator winding method comprising the steps of initially winding a first series of coil groups including a plurality of coils in a first group of stator slots to provide a first coil layer, subsequently winding a second series of coil groups including a second plurality of coils in lapped relation to the coils of the first series of coil groups and in a second group of stator slots exclusive of the first group of stator slots to provide a second coil layer inwardly of the first coil layer with respect to the stator axis, and subsequently winding a third series of coil groups including a third plurality of coils in a third group of stator slots exclusive of the first and second groups of stator slots, and in lapped relation to the coils of the first and second series of coil groups to provide a third coil layer inwardly of the second coil layer with respect to the stator axis.

10. A stator winding method comprising the steps of initially winding a first series of coil groups including a plurality of coils in a first group of stator slots to provide a first coil layer with at least some of the coils in the first series of coil groups occupying the same slots of the first group of stator slots, subsequently winding a second series of coil groups including a second plurality of coils in lapped relation to the coils of the first series of coil groups and in a second group of stator slots exclusive of the first group of stator slots to provide a second coil layer inwardly of the first coil layer with respect to the stator axis with at least some of the coils of the second series of coils groups occupying the same slots in the second group of stator slots, and subsequently winding a third series of coil groups including a third plurality of coils in a third group of stator slots exclusive of the first and second groups of stator slots, and in lapped relation to the coils of the first and second series of coil groups to provide a third coil layer inwardly of the second coil layer with respect to the stator axis with at least some of the coils in the third series of coil groups occupying the same slots in the third group of stator slots.

11. A stator winding method comprising the steps of initially laying a first coil in one rotative direction through a first pair of angularly spaced stator slots, subsequently laying a second coil with substantially the same number of turns as the first coil and in the opposite rotative direction through a second pair of angularly spaced stator slots spaced from the first pair of stator slots, subsequently laying a third coil with approximately one-half the number of turns as the second coil and in concentric relation to the second coil and in the same rotative direction as in the second coil through an intermediate stator slot located between the first and second pairs of stator slots, subsequently laying a fourth coil with approximately one-half the number of turns as the first coil in concentric relation to the first coil and in the same rotative direction as in the first coil through the intermediate slot.

12. A stator winding method comprising the steps of initially winding a wire in one rotative direction through a first pair of angularly spaced stator slots to provide a first coil, subsequently winding the wire in the opposite rotative direction through a second pair of angularly spaced stator slots spaced from the first pair of stator slots to provide a second coil, subsequently winding the wire in concentric relation to the second coil and in the same rotative direction as in the second coil through an intermediate stator slot located between the first and second pairs of stator slots to provide a third coil, and subsequently winding the wire in concentric relation to the first coil and in the same rotative direction as in the first coil through the intermediate stator slot to provide a fourth coil.

13. A stator winding method comprising the steps of initially winding a wire in one rotative direction through a first pair of angularly spaced stator slots to provide a first coil, subsequently winding the wire in the opposite rotative direction through a second pair of angularly spaced stator slots spaced from the first pair of stator slots to provide a second coil with substantially the same number of turns as the first coil, subsequently winding the wire in concentric relation to the second coil and in the same rotative direction as in the second coil through an intermediate stator slot located between the first and second pairs of stator slots to provide a third coil having approximately one-half the number of turns as the second coil, and subsequently winding the wire in concentric relation to the first coil and in the same rotative direction as in the first coil through the intermediate stator slot to provide a fourth coil having approximately one-half the number of turns as the first coil.

14. A stator winding method comprising the steps of initially winding a wire in one rotative direction through first and second stator slots angularly spaced at seventy degrees from each other to provide a first coil, subsequently winding the wire in unbroken condition in the opposite rotative direction through third and fourth stator slots angularly spaced at seventy degrees from each other and located at an angular spacing of said fourth slot from said second slot of twenty degrees to provide a second coil with substantially the same number of turns as the first coil, subsequently winding the wire in unbroken condition in concentric relation to the second coil and in the same rotative direction as in the second coil through a fifth stator slot located intermediate the second and fourth stator slots and through a sixth stator slot located on the side of the third stator slot remote from the fourth stator slot to provide a third coil having a span of 90 degrees and approximately one-half the number of turns as the second coil, and subsequently winding the wire in unbroken condition in concentric relation to the first coil and in the same rotative direction as in the first coil through the fifth stator slot and through a seventh sator slot on the side of the first stator slot remote from the second stator slot to provide a fourth coil having a span of ninety degrees and approximately one-half the number of turns as the first coil.

15. A stator winding method comprising the steps of initially winding a first series of coil groups including a plurality of coils in a first group of stator slots to provide a first coil layer with at least some of the coils in the first series of coil groups occupying the same slots of the first group of stator slots, and subsequently winding a second series of coil groups including a second plurality of coils in lapped relation to the coils of the first series of coil groups and in a second group of stator slots exclusive of the first group of stator slots to provide a second coil layer inwardly of the first coil layer with respect to the stator axis with at least some of the coils of the second series of coil groups occupying the same slots in the second group of stator slots.

References Cited
UNITED STATES PATENTS

| | | | |
|---|---|---|---|
| 1,488,873 | 4/1924 | Francis | 310—180 |
| 3,324,322 | 6/1967 | Johns | 310—198 |
| 3,333,330 | 8/1967 | Linkous | 29—596 |
| 3,348,084 | 10/1967 | Jordan | 310—202 |

OTHER REFERENCES

Croft, Alternating-current Armature Winding, 1st ed., 1924, McGraw-Hill Book Co., pp. 37, 38.

WARREN E. RAY, *Primary Examiner.*

U.S. Cl. X.R.

29—596; 310—195, 208